M. S. GLOVER.
DRAFT EQUALIZER.
APPLICATION FILED FEB. 17, 1910.
986,278.
Patented Mar. 7, 1911.
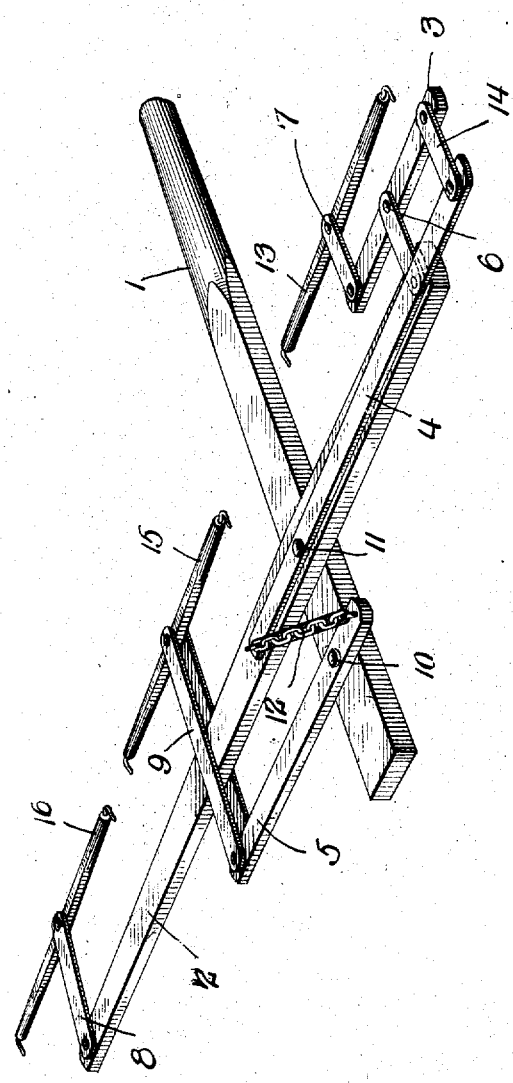
Witnesses
Harry King
V. B. Hillyard
Inventor
Milford S. Glover.
By Victor J. Evans
Attorney

UNITED STATES PATENT OFFICE.

MILFORD S. GLOVER, OF BIGHILL, TEXAS.

DRAFT-EQUALIZER.

986,278.

Specification of Letters Patent.

Patented Mar. 7, 1911.

Application filed February 17, 1910. Serial No. 544,410.

*To all whom it may concern:*

Be it known that I, MILFORD S. GLOVER, a citizen of the United States, residing at Bighill, in the county of Limestone and State of Texas, have invented new and useful Improvements in Draft-Equalizers, of which the following is a specification.

This invention has for its object to provide an appliance for equalizing or evening the draft between draft animals arranged unequally upon opposite sides of a pole or tongue, so that a machine may run close to a closure or may operate in the field without endangering the trampling down of grain by the team employed for drawing a machine, such as a mower or harvester, over a field.

The invention provides an equalizing appliance, which may be adjusted to the difference in pull between the different draft animals, so that the draft may be evened and each animal compelled to draw a proportionate part of the load.

The invention consists of the novel features, details of construction and combination of parts, which hereinafter will be more particularly set forth, claimed, and illustrated in the accompanying drawing, which is a perspective view of a draft equalizer embodying the invention.

Referring to the drawing the numeral 1 designates a pole or tongue, which may be attached to the machine or vehicle to be drawn. An equalizing lever 2 is arranged transversely of the pole 1 and pivotally connected thereto near one end. A lever 3 is located forwardly of the short arm of the equalizing lever 2 and is connected therewith by means of a link 6. A swingletree 13 is connected by means of a link 7 to the inner end of the lever 3. A link 14 connects the outer end of the lever 3 with the long arm of a lever 4, which is pivoted to the pole or tongue at 11 by means of a bolt or other suitable fastening, said fastening also serving to pivotally connect the equalizing lever 2 to the pole 1. The lever 4 is placed above the equalizing lever 2 and extends about parallel therewith. The inner or short arm of the lever 4 is connected by means of a chain 12 with the short arm of a lever 5 located in the rear of the levers 2 and 4 and pivotally connected at 10 to the pole 1. The lever 5 extends transversely of the pole 1 about parallel with the levers 2 and 4. A swingletree 15 is connected by means of a link 9 with the long arm of the lever 5. A swingletree 16 is connected to the long arm of the equalizing lever 2 by means of a link 8. The several links are of such relative lengths as to admit of the levers occupying the relative positions disclosed herein and at the same time admitting of the swingletrees occupying a straight line so that the horses may be in line when pulling the load.

By having the parts arranged as set forth one horse upon one side of the pole or tongue is enabled to pull against two horses located upon the opposite side of the pole or tongue, each horse bearing a proportionate amount of the load while at the same time the three horses are enabled to walk abreast.

Having thus described the invention what is claimed as new, is:—

A draft evener comprising a pole or tongue, a transversely arranged equalizing lever pivotally connected near one end to the pole, a lever 5 located in the rear of the equalizing lever and pivoted near one end to the pole, a lever 4 arranged above the equalizing lever and pivoted near one end thereto and to the pole, a lever 3 located in advance of the short arm of the equalizing lever, a link connecting the middle portion of the lever 3 with the short arm of the equalizing lever, a link connecting the outer ends of the levers 3 and 4, a flexible connection between the short arms of the levers 4 and 5, swingletrees, a link connecting one of the swingletrees to the inner end of the lever 3, a link connecting a second swingletree to the long arm of the lever 5, and a link connecting the third swingletree to the long arm of the equalizing lever.

In testimony whereof I affix my signature in presence of two witnesses.

MILFORD S. GLOVER.

Witnesses:
LEE BRADY,
R. A. JACKSON.